United States Patent
Shichino

(10) Patent No.: US 9,642,182 B2
(45) Date of Patent: May 2, 2017

(54) COMMUNICATION APPARATUS AND METHOD OF CONTROLLING COMMUNICATION THEREOF

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 13/950,621

(22) Filed: Jul. 25, 2013

(65) Prior Publication Data

US 2013/0308535 A1 Nov. 21, 2013

Related U.S. Application Data

(62) Division of application No. 12/811,395, filed as application No. PCT/JP2009/054599 on Mar. 4, 2009, now Pat. No. 8,526,301.

(30) Foreign Application Priority Data

Mar. 14, 2008 (JP) .................................. 2008-066735

(51) Int. Cl.
| | |
|---|---|
| H04W 76/06 | (2009.01) |
| H04N 21/436 | (2011.01) |
| H04N 21/4363 | (2011.01) |
| H04L 29/08 | (2006.01) |

(52) U.S. Cl.
CPC ............. *H04W 76/06* (2013.01); *H04L 67/24* (2013.01); *H04N 21/43615* (2013.01); *H04N 21/43637* (2013.01)

(58) Field of Classification Search
None
See application file for complete search history.

(56) References Cited

U.S. PATENT DOCUMENTS

| | | | | |
|---|---|---|---|---|
| 6,047,178 A | * | 4/2000 | Frlan ................... | H04W 88/085 455/423 |
| 7,577,111 B2 | * | 8/2009 | Yeung et al. ................. | 370/310 |
| 7,693,107 B2 | * | 4/2010 | De Froment ................. | 370/331 |

(Continued)

FOREIGN PATENT DOCUMENTS

| | | |
|---|---|---|
| EP | 1331791 A2 | 7/2003 |
| JP | 2006-101416 A | 4/2006 |

(Continued)

OTHER PUBLICATIONS

Jun. 18, 2009 International Search Report and Written Opinion in International Patent Appln. No. PCT/JP2009/054599.

(Continued)

*Primary Examiner* — Donald Mills
(74) *Attorney, Agent, or Firm* — Fitzpatrick, Cella, Harper & Scinto

(57) ABSTRACT

Disclosed is a communication apparatus in a network system constituted by a plurality of communication apparatuses, wherein the fact that a specific communication apparatus connected to a temporary network constructed temporarily has left the temporary network is detected. In response to the specific communication apparatus leaving the temporary network, another communication apparatus connected to the temporary network is allowed to return to the original network.

12 Claims, 18 Drawing Sheets

(56) References Cited

U.S. PATENT DOCUMENTS

| | | |
|---|---|---|
| 7,864,696 B2 | 1/2011 | Sawada |
| 8,233,405 B2 | 7/2012 | Sakai |
| 8,972,552 B2 | 3/2015 | Shichino |
| 2003/0003912 A1 | 1/2003 | Melpignano et al. |
| 2003/0179742 A1 | 9/2003 | Ogier et al. |
| 2003/0179750 A1 | 9/2003 | Hasty et al. |
| 2005/0174962 A1* | 8/2005 | Gurevich .............. H04W 88/06 370/328 |
| 2006/0039298 A1 | 2/2006 | Zuniga et al. |
| 2006/0153085 A1 | 7/2006 | Willins et al. |
| 2007/0043844 A1 | 2/2007 | Sakai |
| 2007/0160017 A1 | 7/2007 | Meier et al. |
| 2007/0180071 A1 | 8/2007 | Koide |
| 2007/0189192 A1 | 8/2007 | Kim |
| 2007/0265009 A1 | 11/2007 | Hamaguchi |
| 2009/0080390 A1 | 3/2009 | Zhou et al. |
| 2010/0299428 A1 | 11/2010 | Shichino |
| 2012/0269094 A1 | 10/2012 | Sakai |

FOREIGN PATENT DOCUMENTS

| | | |
|---|---|---|
| JP | 2006-173708 A | 6/2006 |
| JP | 2006-352282 A | 12/2006 |
| JP | 2008-011068 A | 1/2008 |
| JP | 2008-035373 A | 2/2008 |
| JP | 2008-053889 A | 3/2008 |

OTHER PUBLICATIONS

Jun. 17, 2010 International Preliminary Report on Patentability in International Patent Appln. No. PCT/JP2009/054599.

* cited by examiner

FIG. 10

| SERIAL NUMBER (1000) | MAC ADDRESS (1001) | PHYSICAL FUNCTION (1002) | LOGICAL FUNCTION (1003) |
|---|---|---|---|
| 1 | aa:aa:aa:aa:aa:aa | STA | COMMAND TERMINAL |
| 2 | bb:bb:bb:bb:bb:bb | STA | OTHER |
| 3 | | | |

~900

F I G. 12
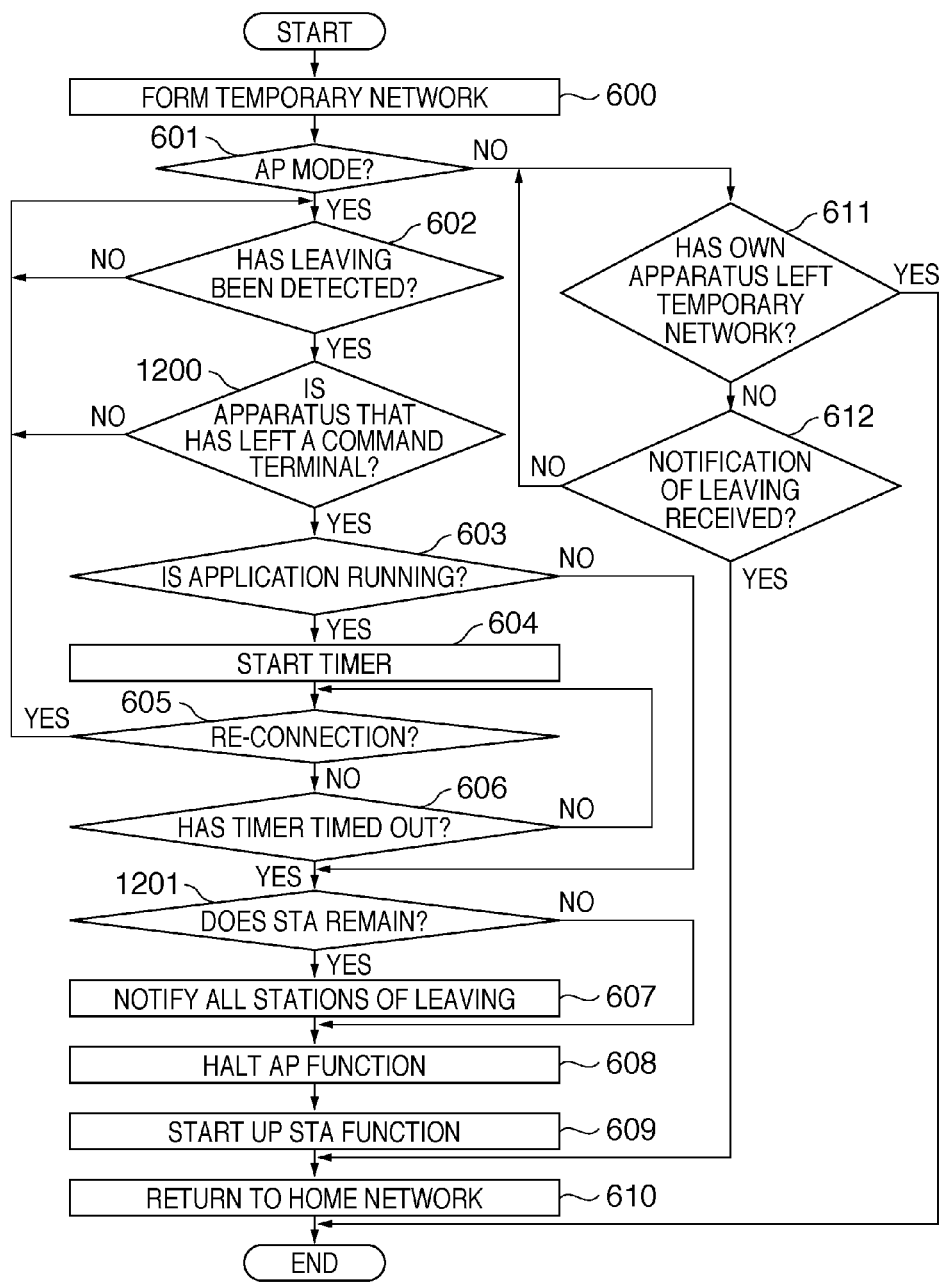

| | SERIAL NUMBER 1000 | MAC ADDRESS 1001 | PHYSICAL FUNCTION 1002 | LOGICAL FUNCTION 1003 | |
|---|---|---|---|---|---|
| | 1 | aa:aa:aa:aa:aa:aa | STA | COMMAND TERMINAL | 900 |
| | 2 | bb:bb:bb:bb:bb:bb | STA | OTHER | |
| 1400 | 3 | cc:cc:cc:cc:cc:cc | STA | COMMAND TERMINAL | |

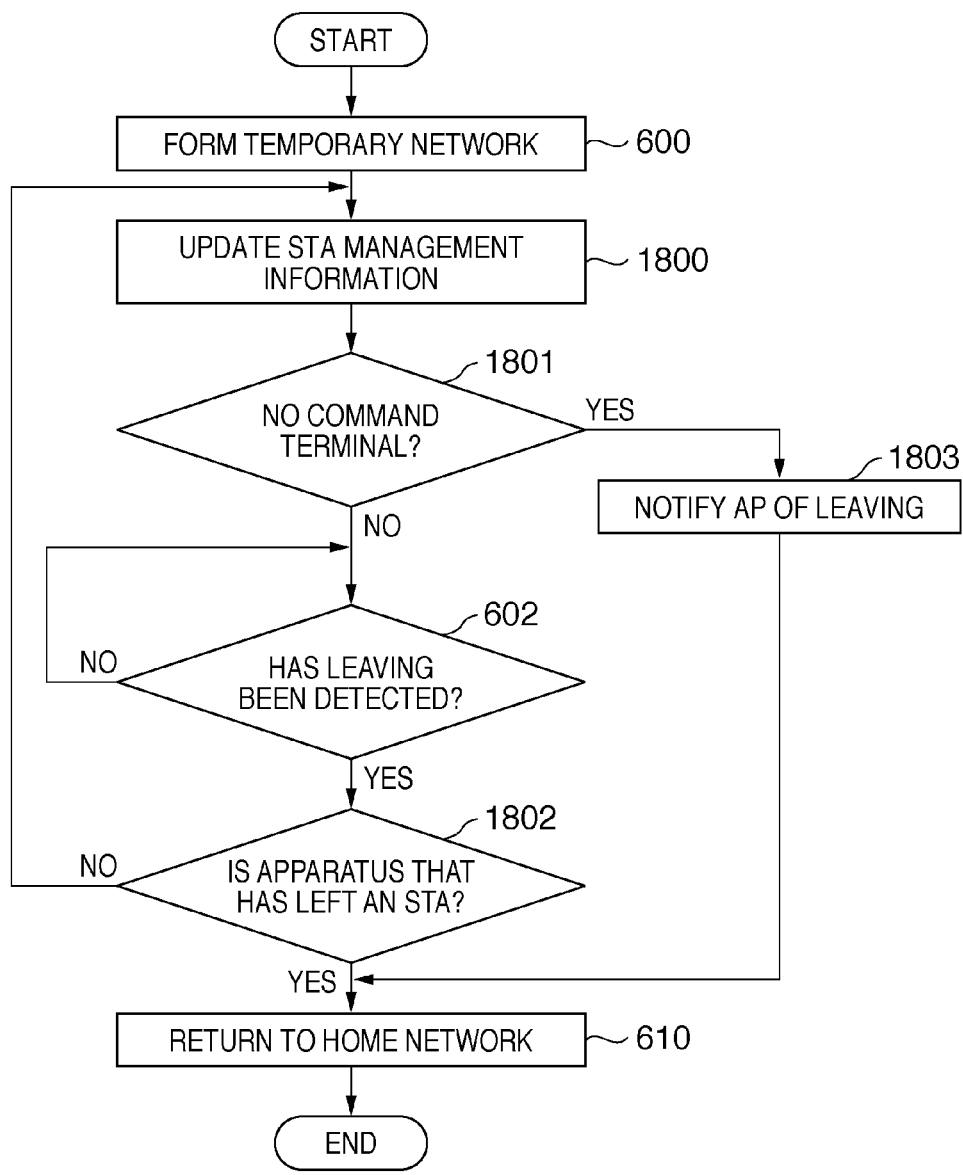
F I G. 18

FIG. 19

| No. | MAC ADDRESS | PHYSICAL FUNCTION | LOGICAL FUNCTION |
|---|---|---|---|
| 1 | aa:aa:aa:aa:aa:aa | STA | COMMAND TERMINAL |
| 2 | dd:dd:dd:dd:dd:dd | AP | OTHER |
| 3 | cc:cc:cc:cc:cc:cc | STA | COMMAND TERMINAL |

FIG. 20

| No. | MAC ADDRESS | PHYSICAL FUNCTION | LOGICAL FUNCTION |
|---|---|---|---|
| 1 | | | |
| 2 | dd:dd:dd:dd:dd:dd | AP | OTHER |
| 3 | cc:cc:cc:cc:cc:cc | STA | COMMAND TERMINAL |

FIG. 21

| No. | MAC ADDRESS | PHYSICAL FUNCTION | LOGICAL FUNCTION |
|---|---|---|---|
| 1 | | | |
| 2 | dd:dd:dd:dd:dd:dd | AP | OTHER |
| 3 | | | |

COMMUNICATION APPARATUS AND METHOD OF CONTROLLING COMMUNICATION THEREOF

This application is a divisional of application Ser. No. 12/811,395 filed on Jul. 1, 2010, which was the National Stage of International Application No. PCT/JP2009/054599 filed on Mar. 4, 2009.

TECHNICAL FIELD

The present invention relates to a communication apparatus in a network system constituted by a plurality of communication apparatuses, and to a method of controlling communication in this apparatus.

BACKGROUND ART

Wireless LAN products available on the market include dual-mode-compatible products having both an access point (AP) function and a station (STA) function.

Further, functions for the purpose of enhancing security and for utilizing wireless bandwidth effectively have also been provided. For example, the specification of Japanese Patent Laid-Open No. 2006-101416 provides a communication scheme for connecting to a first network, sending and receiving information relating to the construction of a new second network within the first network and shifting to the second network in order to execute an application.

However, with this example of the prior art, a problem which arises is that if a station participating in the second network leaves the network, other stations in the second network cannot return to the first network.

FIG. 22 is a sequence diagram useful in describing this problem that arises in the conventional network communication control method. In this example, a personal computer (PC) 101, display 102, printer 103 and digital video camera 104 are connected to an access point (AP) 100 and form a home network. Under these conditions, the digital video camera 104 requests the formation of a temporary network and the display 102 forms the temporary network by acting as an AP. Thereafter, the digital video camera 104 leaves the temporary network.

First, the digital video camera 104 sends the printer 103 a network transition request via the AP 100 (S2200). In response to this network transition request, the printer 103 issues a network transition response (S2201). Similarly, the digital video camera 104 sends the display 102 a network transition request via the AP 100 (S2202), and the display 102 issues a network transition response (S2203).

Next, the display 102 ceases operating in the STA mode (S2204) and operates in the AP mode (S2205). The display 102 then transmits a beacon signal (not shown) periodically. When the display 102 operates in the AP mode, the camera 104 and printer 103 each execute processing to connect to the display 102 (S2206 to S2209) and form a temporary network. By virtue of the temporary network, the camera 104 displays a streaming image on the display 102 and prints to the printer 103.

Subsequently, if the user of the camera 104 cuts off power to the camera or if communication quality deteriorates, communication between the camera 104 and display 102 is interrupted (S2210). Since the display 102 is operating as an AP in this case, it detects that the camera 104 has left the temporary network.

However, the connection between the display 102 and printer 103 is maintained. As a result, the display 102 and printer 103 are left in a state in which they are not being used by anyone and cannot return to the home network.

Accordingly, the personal computer 101 cannot access the display 102 and printer 103 via the AP 100 of the home network (S2211, S2212, S2213).

Thus, as described above, a problem with the conventional communication control method is that the system is not user friendly as far as devices connected to the home network are concerned.

DISCLOSURE OF INVENTION

The present invention is such that in a situation where a specific communication apparatus has left a temporary network, all communication apparatuses are allowed to return to the original network.

In accordance with an embodiment of the present invention, there is provided a communication apparatus comprising: detecting means for detecting that a specific communication apparatus connected to a temporary network that has been constructed temporarily has left the temporary network; and returning means, responsive to the specific communication apparatus leaving the temporary network, for returning another communication apparatus connected to the temporary network to an original network to which it was connected prior to the connection to the temporary network.

In accordance with an embodiment of the present invention, there is provided a communication control method of a communication apparatus, comprising: a detecting step of detecting that a specific communication apparatus connected to a temporary network that has been constructed temporarily has left the temporary network; and responsive to the specific communication apparatus leaving the temporary network, a return step of returning another communication apparatus connected to the temporary network to an original network to which it was connected prior to the connection to the temporary network.

Further features of the present invention will become apparent from the following description of exemplary embodiments with reference to the attached drawings.

BRIEF DESCRIPTION OF DRAWINGS

FIG. 10 is a diagram illustrating in detail the content of a STA management register;

FIG. 12 is a flowchart illustrating communication control of a communication apparatus in the second embodiment;

FIG. 18 is a flowchart illustrating communication control of a communication apparatus in the fourth embodiment;

FIG. 19 is a diagram illustrating the content of the STA management register of a printer;

FIG. 20 is a diagram illustrating the content of the STA management register of a printer;

FIG. 21 is a diagram illustrating the content of the STA management register of a printer.

BEST MODE FOR CARRYING OUT THE INVENTION

Preferred embodiments of the present invention will now be described in detail with reference to the drawings.

[First Embodiment]

Described as a first embodiment is communication control in which, if a specific communication apparatus that has shifted from a home network to a temporary network leaves the temporary network, another communication apparatus in the temporary network is allowed to return to the home network. First, the communication apparatus constituting the network and the structure of the apparatus will be described with reference to FIGS. 1 to 4.

Figure 1:
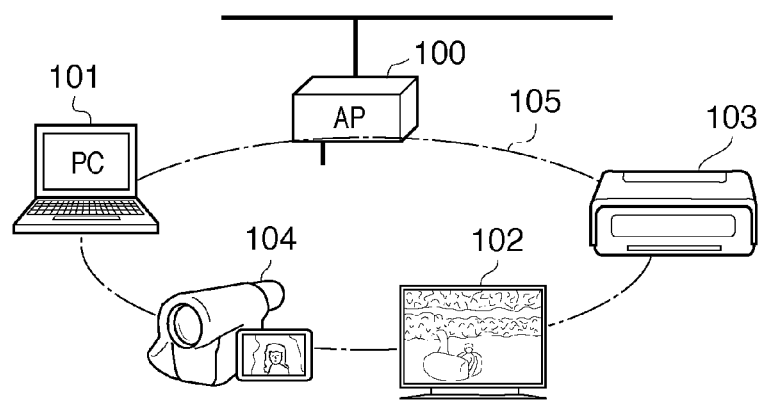
FIG. 1 is a diagram illustrating an example of the configuration of a home network system according to a first embodiment of the present invention.

FIG. 1 is a diagram illustrating an example of the configuration of a home network system according to the first embodiment. Here personal computer (PC) 101, display 102, printer 103 and digital video camera 104 are connected as stations (STA) to access point (AP) 100 and form a home network 105. The display 102, printer 103 and camera 104 are dual terminals having both an AP function and a STA function and capable of operating in dual modes (the AP mode and STA mode).

Here an access point is an apparatus that accommodates a station and operates as a base station. A station is an apparatus that participates as a terminal in a network constructed by the access point and communicates wirelessly via the access point. Further, dual mode is a mode in which operation is possible in both the AP mode, in which an apparatus operates as an access point, and in the STA mode, in which the apparatus operates as a station.

Figure 2:
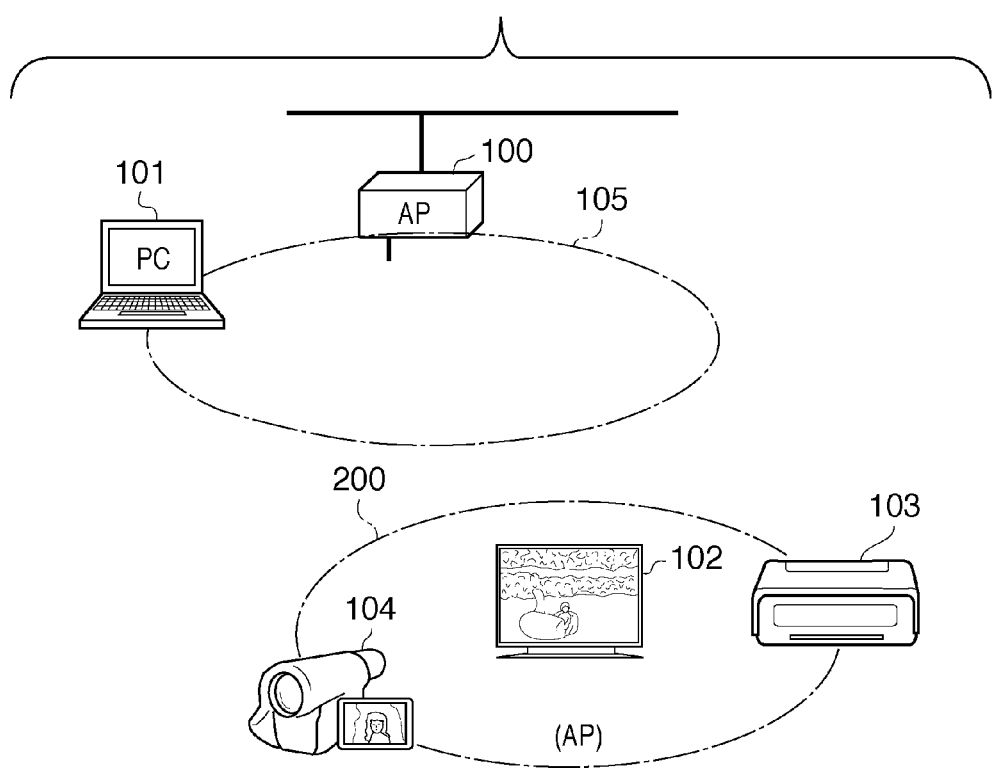
FIG. 2 is a diagram illustrating an example of the configuration of a network system newly constructed from the home network.

FIG. 2 is a diagram illustrating an example of the configuration of a network system constructed temporarily from the home network. In this example, the state shown is one in which the user of the camera 104 requests the formation of a temporary network in order that the user may use the display 102 and printer 103, wherein the display 103 operates in the AP mode to construct a temporary network 200. It should be noted that the printer 103 and camera 104 also are capable of operating in the AP mode.

Figure 3:
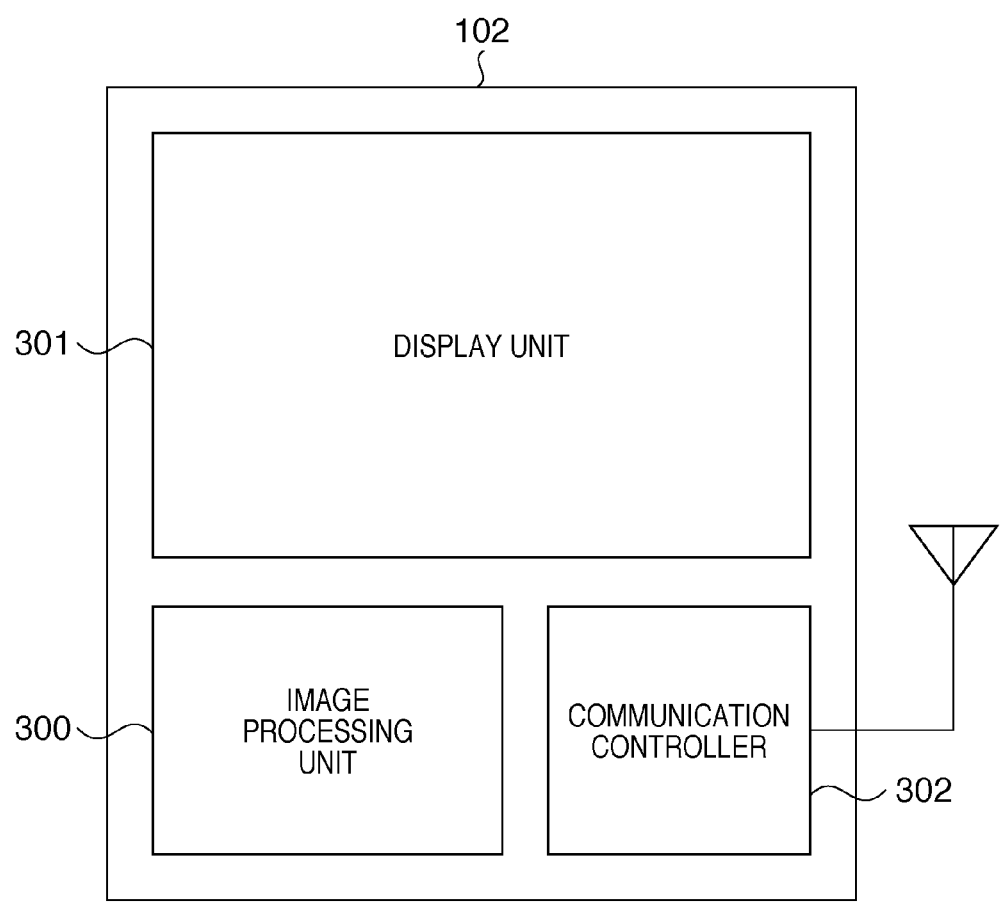
FIG. 3 is a diagram illustrating an example of the configuration of a display in the first embodiment.

FIG. 3 is a diagram illustrating an example of the configuration of the display 102 in the first embodiment. As illustrated in FIG. 3, the display 102 includes an image processing unit 300, a display unit 301 and a communication controller 302. Here the image processing unit 300 executes processing of an image displayed on the display unit 301. The communication controller 302 controls communication between this apparatus and the other apparatuses shown in FIGS. 1 and 2.

Figure 4:
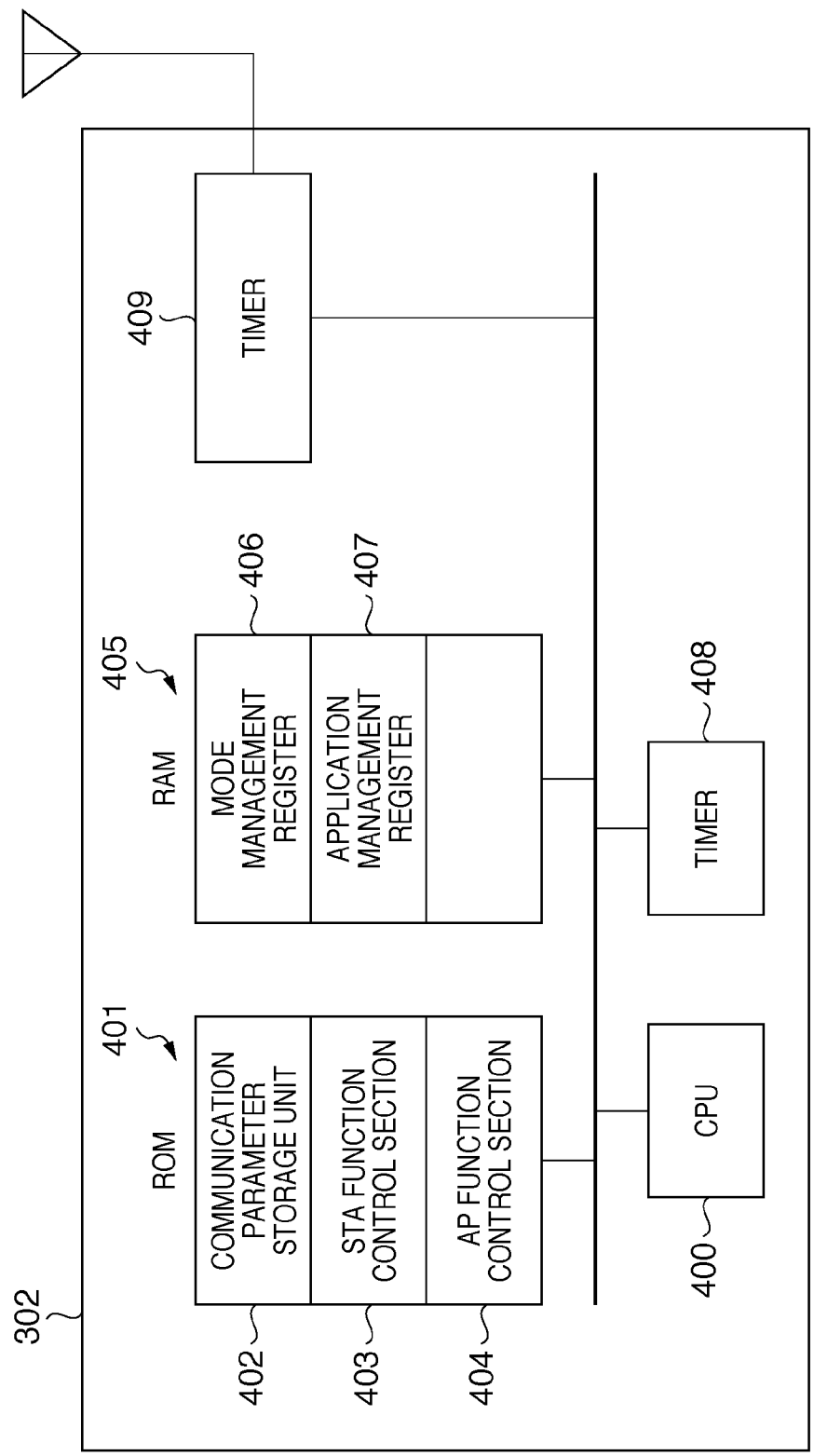
FIG. 4 is a diagram illustrating in detail the structure of a communication controller of the display in the first embodiment.

FIG. 4 is a diagram illustrating in detail the structure of the communication controller 302 of the display 102 in the first embodiment. Although this embodiment is described taking the display 102 as an example, it is assumed that the communication controllers of the other dual terminals such as the printer 103 are similarly constructed.

A CPU 400 controls the overall communication controller 302 in accordance with programs and data stored in a ROM 401. The ROM 401 has a STA function control section 403 in which a program that causes the display 102 to perform the STA function has been stored, and an AP function control section 404 in which a program that causes the display 102 to perform the AP function has been stored. Also provided within the ROM 401 is a communication parameter storage unit 402 for storing communication parameters necessary in order to connect to the home network 105 or temporary network 200.

A RAM 405 has an area (not shown) in which a program within the ROM 401 is expanded, a mode management register 406 and an application management register 407. The mode management register 406 stores whether the display 102 is operating in the AP mode or STA mode. More specifically, the CPU 400 writes logical "1" to the mode management register 406 if the display 102 operates in the AP mode and writes logical "0" to the mode management register 406 if the display 102 operates in the STA mode.

The application management register 407 manages the operating state of a host application between this apparatus and another communication apparatus such as the printer 103 or camera 104. If the host application is operating, the CPU 400 writes "1" to the application management register 407; otherwise, the CPU 400 writes "0" to the application management register 407. It should be noted that the determination as to whether the application is operating can be made by determining whether a communication port has been opened for every communication apparatus.

The timer 408 is a programmable timer that is programmable by the CPU 400. The timer measures a period of time that has been set by the CPU 400 and causes the CPU 400 to generate an interrupt signal when the time period elapses. A wireless unit 409 communicates wirelessly with other communication apparatuses via an antenna by a wireless LAN function compliant with IEEE 802.11.

Figure 5:
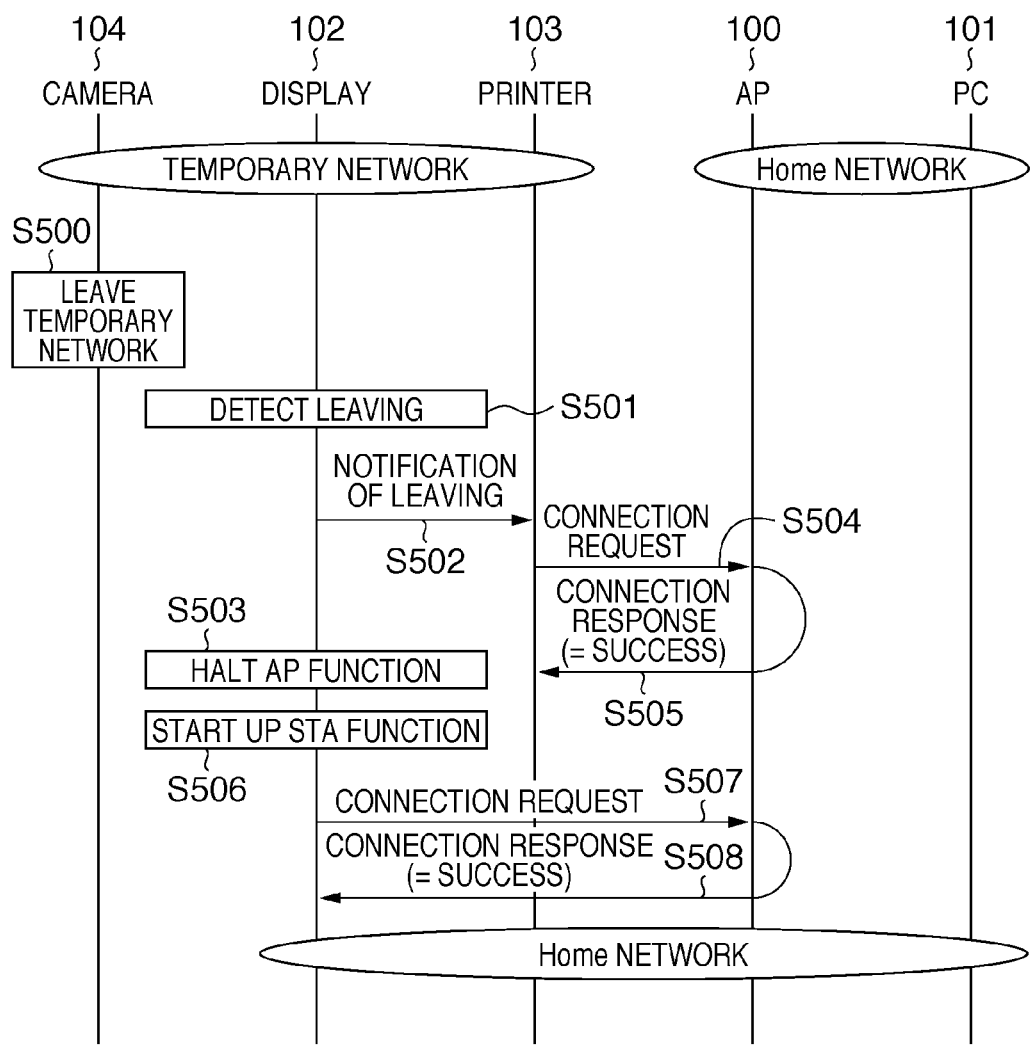
FIG. 5 is a sequence diagram illustrating communication control for allowing a communication apparatus to return from a temporary network to a home network in the first embodiment.
Figure 6:
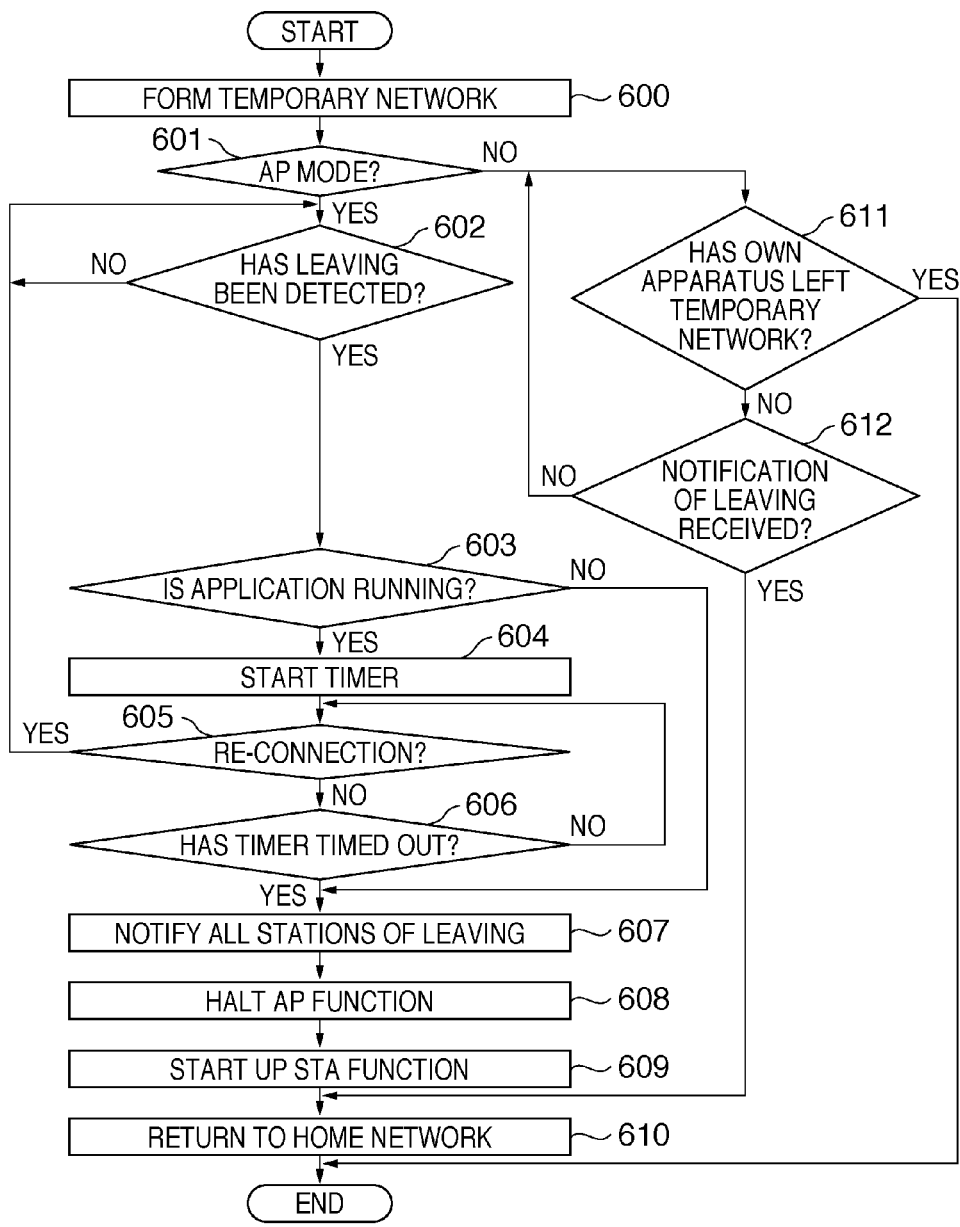
FIG. 6 is a flowchart illustrating communication control of a communication apparatus in the first embodiment.

Reference will now be had to FIGS. 5 and 6 to describe operation in which, after the camera 104 leaves the temporary network 200, the printer 103 and display 102 return from the temporary network 200 to the home network 105.

FIG. 5 is a sequence diagram illustrating communication control for allowing a communication apparatus to return from the temporary network to the home network in the first embodiment.

FIG. 6 is a flowchart illustrating communication control of a communication apparatus in the first embodiment. It should be noted that this communication control is executed by the communication controllers of the camera 104, display 102 and printer 103.

As illustrated in FIG. 5, the dual terminals of the camera 104, display 102 and printer 103 form the temporary network 200 (600). At this time the camera 104, display 102 and printer 103 each store communication parameters, which are necessary for connection to the home network 105, in the respective communication parameter storage units 402. Further, since the display 102 is operating in the AP mode, "1" is written to its mode management register 406, and since the camera 104 and printer 103 are operating in the STA mode, "0" is written to their mode management registers 406.

The CPU 400 of the display 102 checks the mode management register 406 and judges that the display 102 is operating in the AP mode ("YES" at 601). Further, the CPUs 400 of the camera 104 and printer 103 check their mode management registers 406 and judge that these are operating in the STA mode ("NO" at 601).

Here the user of the camera 104 operates the camera 104 and intentionally causes the camera 104 to leave the temporary network 200 (S500). The CPU 400 of the display 102 then detects that the camera 104, which is the station under control, has left the temporary network 200 (S501; "YES" at 602). The CPU 400 of the display 102 determines whether or not the application involving the camera 104 is running based upon the value in the application management register 407 (603).

If the value in the application management register 407 is "1", indicating that the application is currently running ("YES" at 603), then the CPU 400 of the display 102 starts up the timer 408 (604) and a reconnection request from the camera 104 is awaited. If the camera 104 subsequently requests re-connection ("YES" at 605), control returns to 602.

On the other hand, if the timer 408 times out ("YES" at 606) or it is determined that the application is not running ("NO" at 603), then all dual terminals (printer 103) are notified that the camera 104 has left the temporary network 200 (S502; 607). The CPU 400 of the display 102 then halts operation in the AP mode (S503; 608) and shifts to the STA mode (S506; 609), after which this CPU 400 transmits a connection request to the AP 100 (S507). When a connection response is received from the AP 100 (S508), the display 102 returns to the home network 105 (610).

At this time the CPU 400 of the display 102 executes return using the communication parameters of the home network 105 stored in its communication parameter storage unit 402. Further, since the camera 400 leaves the temporary network 200 at 611 owing to user operation ("YES" at 611), the CPU 400 of the camera 104 terminates processing.

On the other hand, the printer 103 does not leave the temporary network 200 ("NO" at 611) and the CPU 400 of the printer 103 receives notification from the display 102 that the camera has left the temporary network (S502; "YES" at 612). As a result, the CPU 400 of printer 103 transmits a connection request to the AP 100 using the communication parameters of the home network 105 stored in its communication parameter storage unit 402 (S504).

When a connection response is received from the AP 100 (S505), the printer returns to the home network 105 (610).

Thus, the communication apparatus 102 and display unit 103 can return to the home network 105 and the personal computer 101 can use the display 102 and printer 103.

In accordance with the first embodiment, unused devices are prevented from remaining in the temporary network 200 and a network that is easy for the user of the home network 105 to use can be implemented.

It should be noted that although the display 102 notifies the printer 103 in S502 and 607 that the camera has left the temporary network, this notification need not be given. Here, owing to termination of a beacon signal (not shown) transmitted by the display 102, the printer 103 is capable of detecting the termination of the AP function of the display 102. The sequence in this case is illustrated in FIG. 7.

[First Modification]

Figure 7:
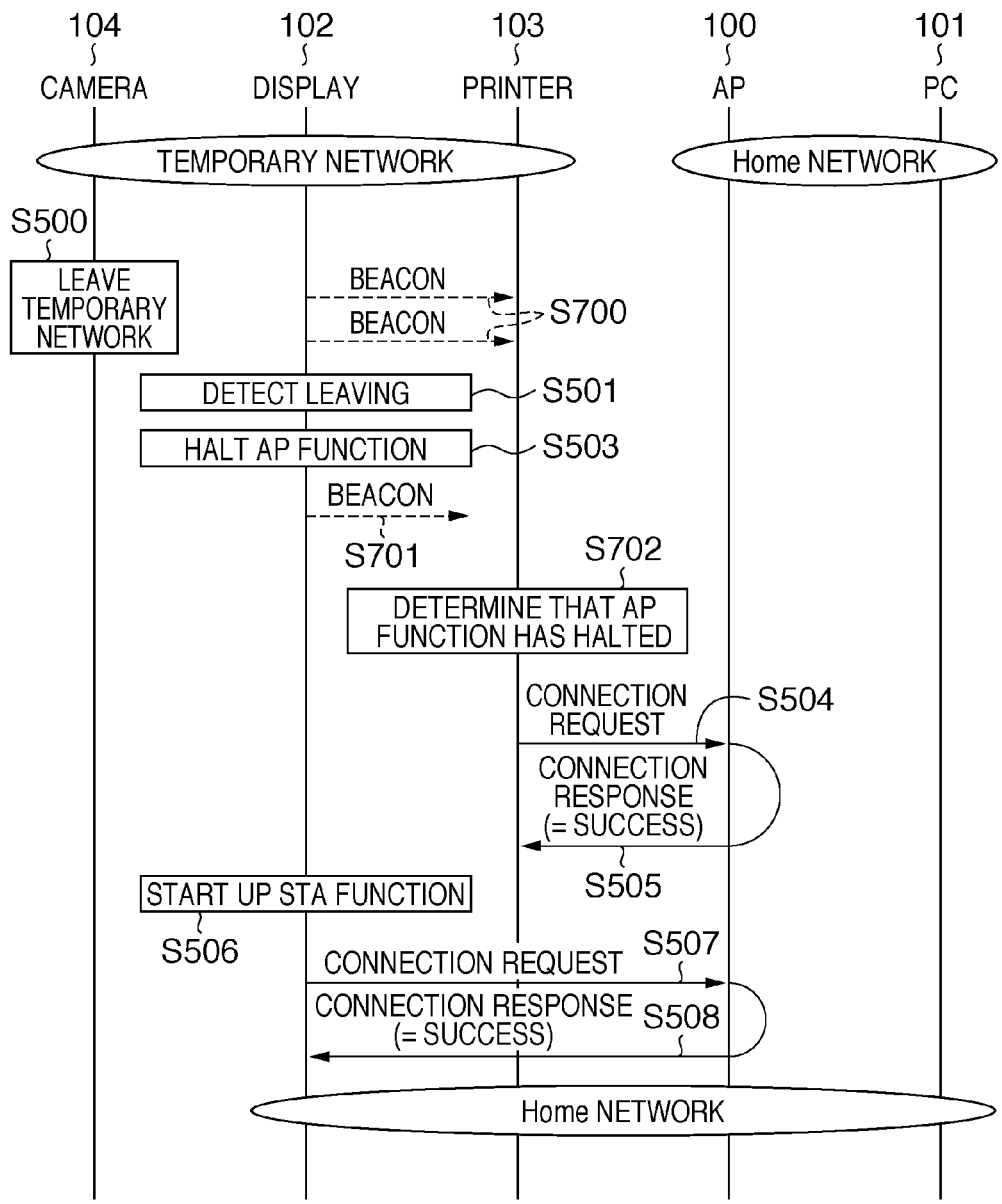
FIG. 7 is a sequence diagram illustrating operation in which a dual terminal returns from a temporary network to a home network in a first modification of the first embodiment.

FIG. 7 is a sequence diagram illustrating operation in which a dual terminal returns from a temporary network to a home network in a first modification of the first embodiment. Operations identical with those of the first embodiment shown in FIG. 5 are designated by like reference characters and need not be described again.

In a manner similar to that of the first embodiment, the CPU 400 of the display 102 halts the AP function (S503) upon detecting (S501) that the camera 104 has left the temporary network 200 in S500. Accordingly, the printer 103 no longer receives (S701) the beacon received periodically (S700) from the display 102 and determines that the AP function of the display 102 has halted (S702). By virtue of this determination, the printer 103 returns to the home network 105 in a manner similar to that of the first embodiment.

[Second Modification]

In another arrangement, rather than giving notification in S502 and 607 that the temporary network has been left, it is permissible to use a signal (a "deauthentication" signal) that disconnects the printer 103 from the temporary network 200.

After the disconnect signal is received, the printer 103 may try to re-connect to the temporary network 200 several times. By refusing all of these several re-connection attempts by the printer 103, the display 102 can suggest to the printer 103 that it return to the home network 105. The sequence in this case is illustrated in FIG. 8.

Figure 8:
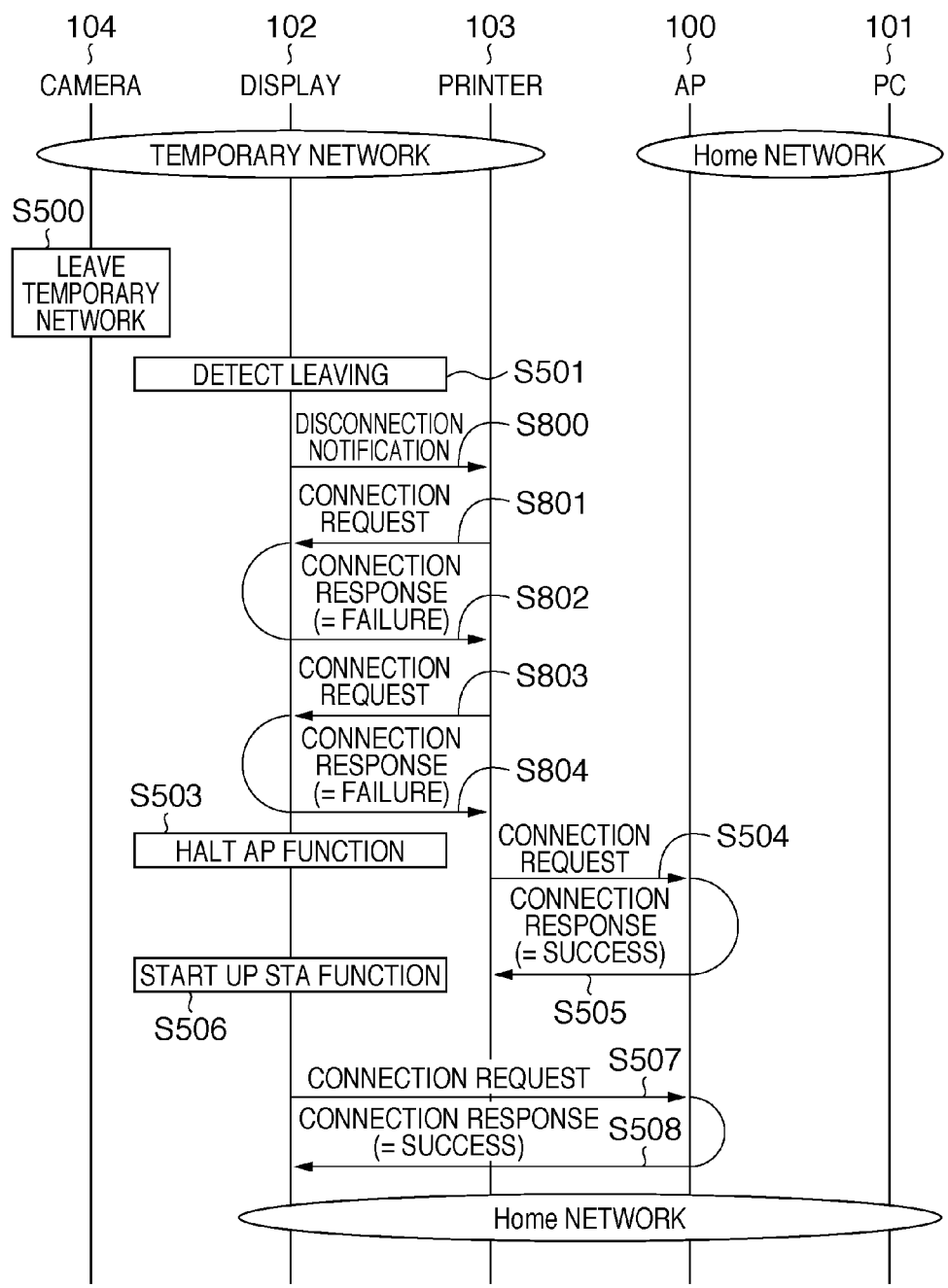
FIG. 8 is a sequence diagram illustrating operation in which a dual terminal returns from a temporary network to a home network in a second modification of the first embodiment.

FIG. 8 is a sequence diagram illustrating operation in which a dual terminal returns from a temporary network to a home network in a second modification of the first embodiment. Operations identical with those of the first embodiment shown in FIG. 5 are designated by like reference characters and need not be described again.

If the CPU 400 of the printer 103 receives a disconnect signal from the display 102 (S800), then it transmits a connection request to the display 102 (S801). The CPU 400 of the display 102 responds to the connection request with a connect response (=failure) (S801) and refuses re-connection of the printer 103. Further, similar processing is executed in S803 and S804.

Owing to refusal of connection requests several times in S801 to S804, the CPU 400 of the printer 103 decides return to the home network 105 and returns to the home network 105 (S504, S505).

Further, it is obvious that similar effects can be obtained even if the notification of leaving the temporary network in S502 in FIG. 5 is implemented by a signal that instructs the printer 103 to return to the home network 105.

Further, the dual terminal (camera 104) that will leave the temporary network 200 may itself so notify the display 102 before leaving. In this way it is possible for a dual terminal (the display 102) that detects such departure from the temporary network to make the detection promptly.

[Second Embodiment]

Next, a second embodiment of the present invention will be described in detail with reference to the drawings. According to the second embodiment, a return to the home network is achieved when a specific communication apparatus having an application command function executed in a temporary network leaves the temporary network. Here the command function is a function that designates printing in the case of a printing application, or a function that selects an image and designates display of the image in the case of an application that selects and displays an image, etc.

A return to the home network is performed only in a case where the communication apparatus having this command function has left the temporary network. As a result, as long as even one commanded terminal exists in the temporary network, the communication apparatus having the command function is capable of using the commanded terminal.

It should be noted that the communication apparatuses constituting the network and the structure of the apparatus are the same as those of the first embodiment described above in conjunction with FIGS. 1 to 3.

Figure 9:
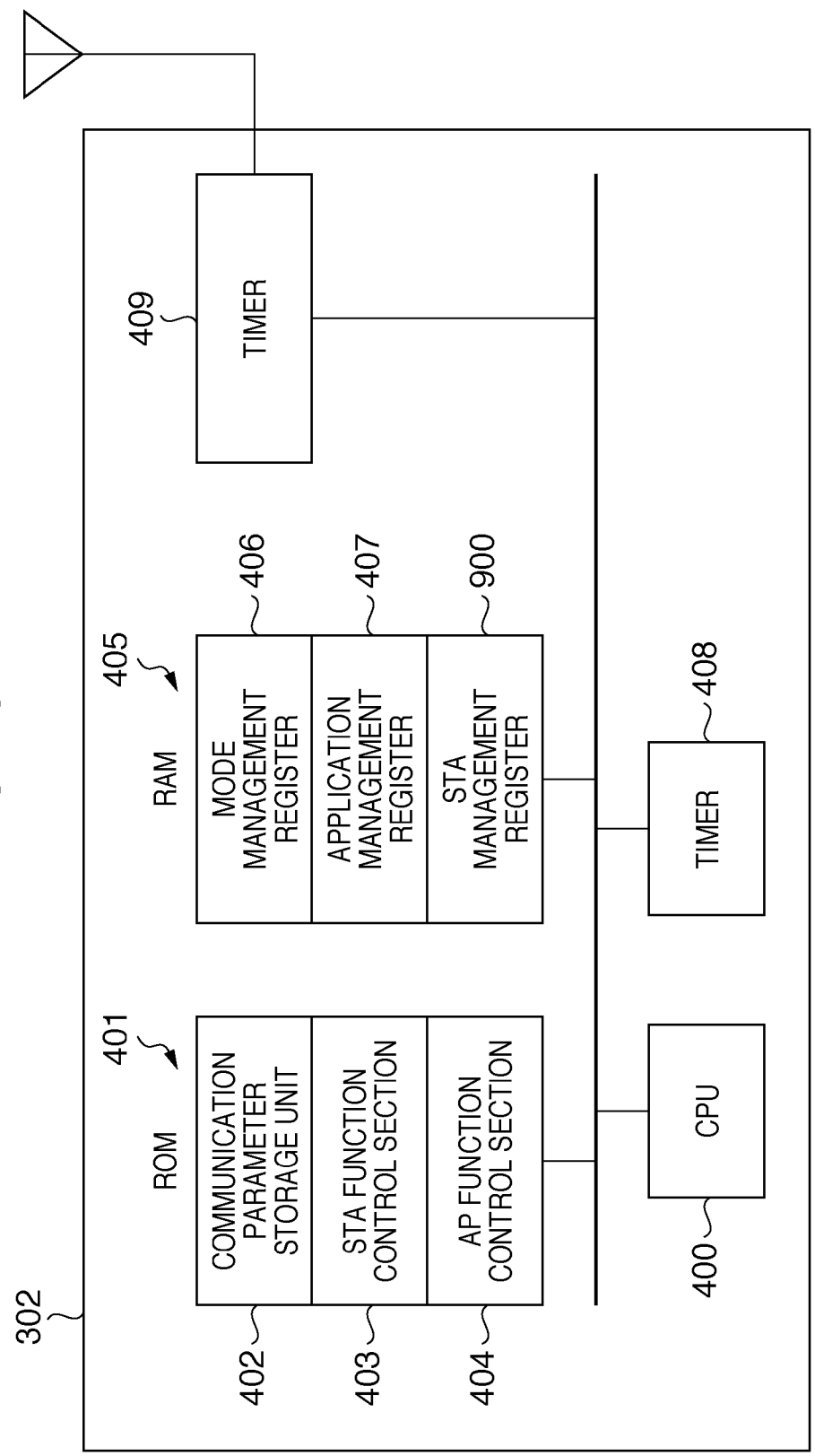
FIG. 9 is a diagram illustrating in detail the structure of the communication controller of the display in a second embodiment of the present invention.

FIG. 9 is a diagram illustrating in detail the structure of the communication controller 302 of the display 102 in the second embodiment. As illustrated in FIG. 9, in the second embodiment, the arrangement of the first embodiment described above with reference to FIG. 4 is further equipped with a STA management register 900. FIG. 10 is a diagram illustrating in detail the content of the STA management register 900.

As illustrated in FIG. 10, the STA management register 900 stores a serial number 1000, MAC address 1001, physical function 1002 and logical function 1003 of each communication apparatuses that exists in the temporary network 200. In a case where a communication apparatus that exists in the temporary network 200 is the above-mentioned command terminal, an entry to this effect is stored as the logical function 1003 thereof.

Figure 11:
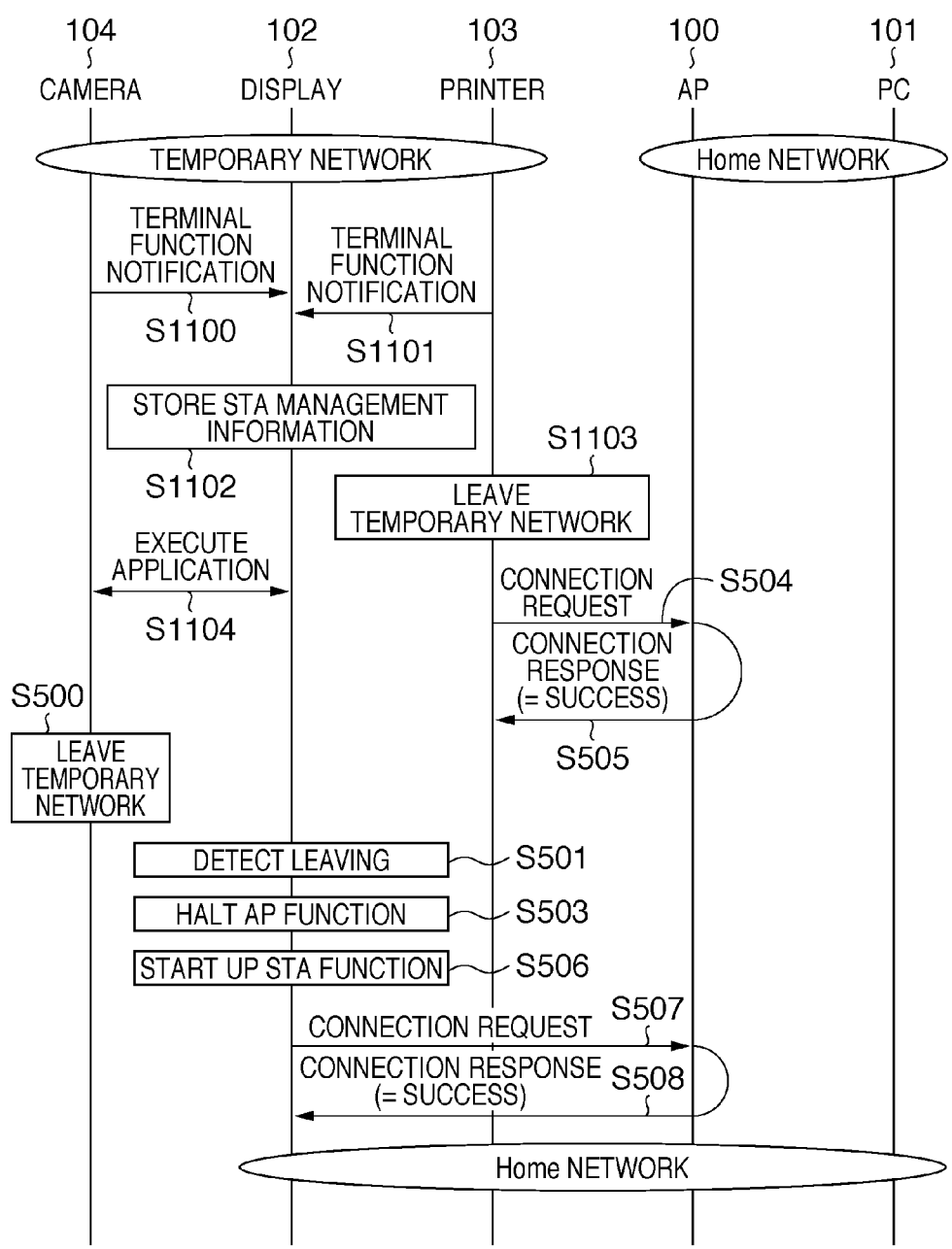
FIG. 11 is a sequence diagram illustrating communication control for allowing each communication apparatus to return from a temporary network to a home network in the second embodiment.

Reference will now be had to FIGS. 11 and 12 to describe operation in which, after a command terminal has left the temporary network, a return to the home network 105 is performed based upon information that has been stored in the STA management register 900 of the display 102. It should be noted that operations similar to those of the first embodiment need not be described again; only operations that differ will be described.

FIG. 11 is a sequence diagram illustrating communication control for allowing each communication apparatus to return from the temporary network to the home network in the second embodiment, and FIG. 12 is a flowchart illustrating communication control of a communication apparatus in the second embodiment. It should be noted that this communication control is executed by the communication controllers of the camera 104, display 102 and printer 103.

As illustrated in FIG. 11, after the camera 104, display 102 and printer 103 construct the temporary network 200, the camera 104 places an indication of the fact that it itself is the command terminal in a terminal-function notification signal and sends this to the display 102 (S1100). Further, the printer 103 places an indication of the fact that it itself is not a command terminal in a terminal-function notification signal and sends this to the display 102 (S1101). On the other hand, the display 102 receives the terminal function notifications from the camera 104 and printer 103, whereupon the CPU 400 stores the MAC address 1001, physical function 1002 and logical function 1003 of each of these devices in the STA management register 900 (S1102).

The STA management register 900 of the display 102 at this time stores information in the manner shown in FIG. 10. Specifically, Serial No. 1 is information relating to the camera 104, for which the MAC address 1001 is "aa:aa:aa: aa:aa:aa", the physical function 1002 is "STA" and the logical function 1003 is "command terminal". Further, Serial No. 2 is information relating to the printer 103, for which the MAC address 1001 is "bb:bb:bb:bb:bb:bb", the physical function 1002 is "STA" and the logical function 1003 is "other".

Assume that under these conditions, communication between the printer 103 and display 102 is severed for some reason (S1103). When this occurs, the CPU 400 of the display 102 refers to the STA management register 900 and determines whether the printer 103 is the command terminal (1200 in FIG. 12). Since printer 103 of Serial No. 2 under serial number 1000 is such that the logical function 1003 thereof is not that of a command terminal in this example ("NO" at 1200), the CPU 400 of the display 102 returns to the processing of 602.

Next, the camera 104 executes an application such as an image display with the display 102 (S1104) and the camera 104 leaves the temporary network 200 in S500. When this occurs, the CPU 400 of the display 102 refers to the STA management register 900 and determines whether the camera 104 is the command terminal (1200). Since camera 104 of Serial No. 1 under serial number 1000 is such that the logical function 1003 thereof is that of a command terminal in this example ("YES" at 1200), the CPU 400 of the display 102 determines at 1201 whether a STA remains in the temporary network 200. In this example, the printer 103 and camera 104 have left the temporary network 200 in S1103 and S500 and, hence, no STA remains in the temporary network 200 ("NO" at 1201). Accordingly, the CPU 400 of the display 102 halts the AP function (S503) and the display 102 returns to the home network 105 (S506 to S508) in a manner similar to that of the first embodiment.

In accordance with the second embodiment, the user of camera 104, which is the command terminal, is capable of using the display 102 within the temporary network 200 even in a case where the printer 103, which is the commanded terminal, has left the temporary network 200.

Further, the terminal function notifications made in S1100 and S1101 may be performed only by the communication apparatus for which the logical function is that of the command terminal. In this case, it can be so arranged that the notification is made in synch with pressing of a playback button (not shown) on the user interface of the camera 104.

Further, in the second embodiment, whether or not the logical function 1003 of the communication apparatus that has left the temporary network is that of the command terminal is adopted as a criterion. However, whether or not the communication apparatus is the communication apparatus that requested the construction of the temporary network 200 may be adopted as the criterion. In this case, the CPU 400 of the display 102 stores as the command terminal the communication apparatus that issued the request, this being stored as logical function 1003 of STA management register 900 (S1102).

[Third Embodiment]

Next, a third embodiment of the present invention will be described in detail with reference to the drawings. Described in the third embodiment is a case where a plurality of communication apparatuses serving as command terminals described in the second embodiment exists in the temporary network 200.

It should be noted that the communication apparatuses constituting the network and the structure of the apparatus are the same as those of the second embodiment described above in conjunction with FIGS. 1 to 3 and FIG. 9.

Figures 13, 14:
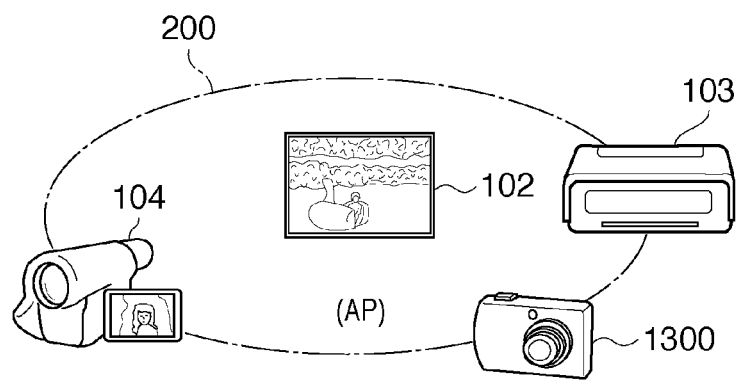
FIG. 13 is a diagram illustrating an example of communication apparatuses connected to a temporary network in a third embodiment of the present invention.
FIG. 14 is a diagram illustrating an example of a STA management register of a display in the third embodiment.

FIG. 13 is a diagram illustrating an example of communication apparatuses connected to the temporary network 200 in the third embodiment. The third embodiment relates to a state in which after the temporary network 200 is constructed as in the manner of the first embodiment, a digital still camera 1300 serving as a command terminal is connected to the temporary network.

FIG. 14 is a diagram illustrating an example of the STA management register 900 of the display 102 in the third embodiment. Here Serial No. 3 under serial number 1000 is information relating to the camera 1300. The logical function 1003 of the camera 1300 is that of the command terminal.

Figure 15:
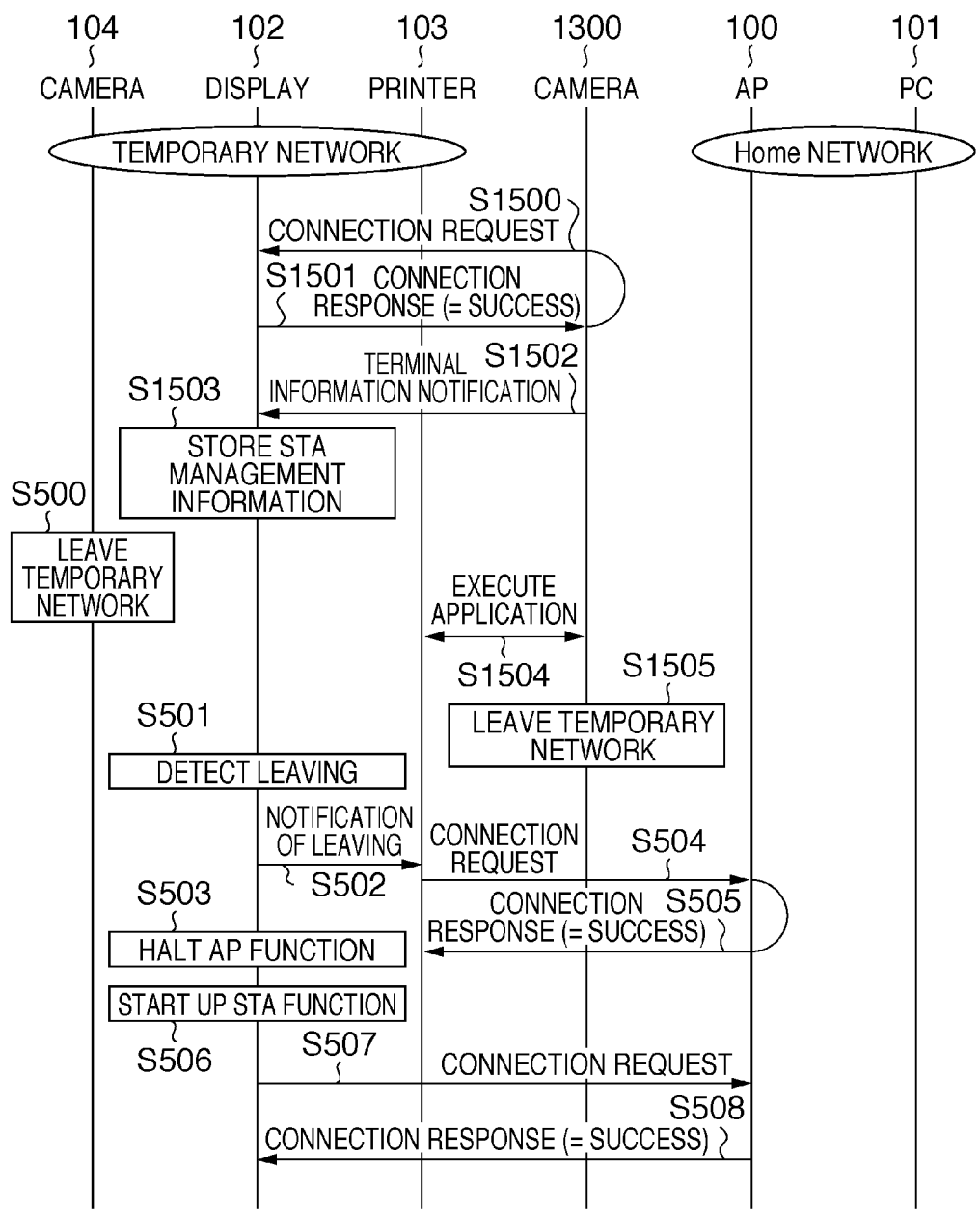
FIG. 15 is a sequence diagram illustrating communication control for allowing each communication apparatus to return from a temporary network to a home network in the third embodiment.
Figure 16:
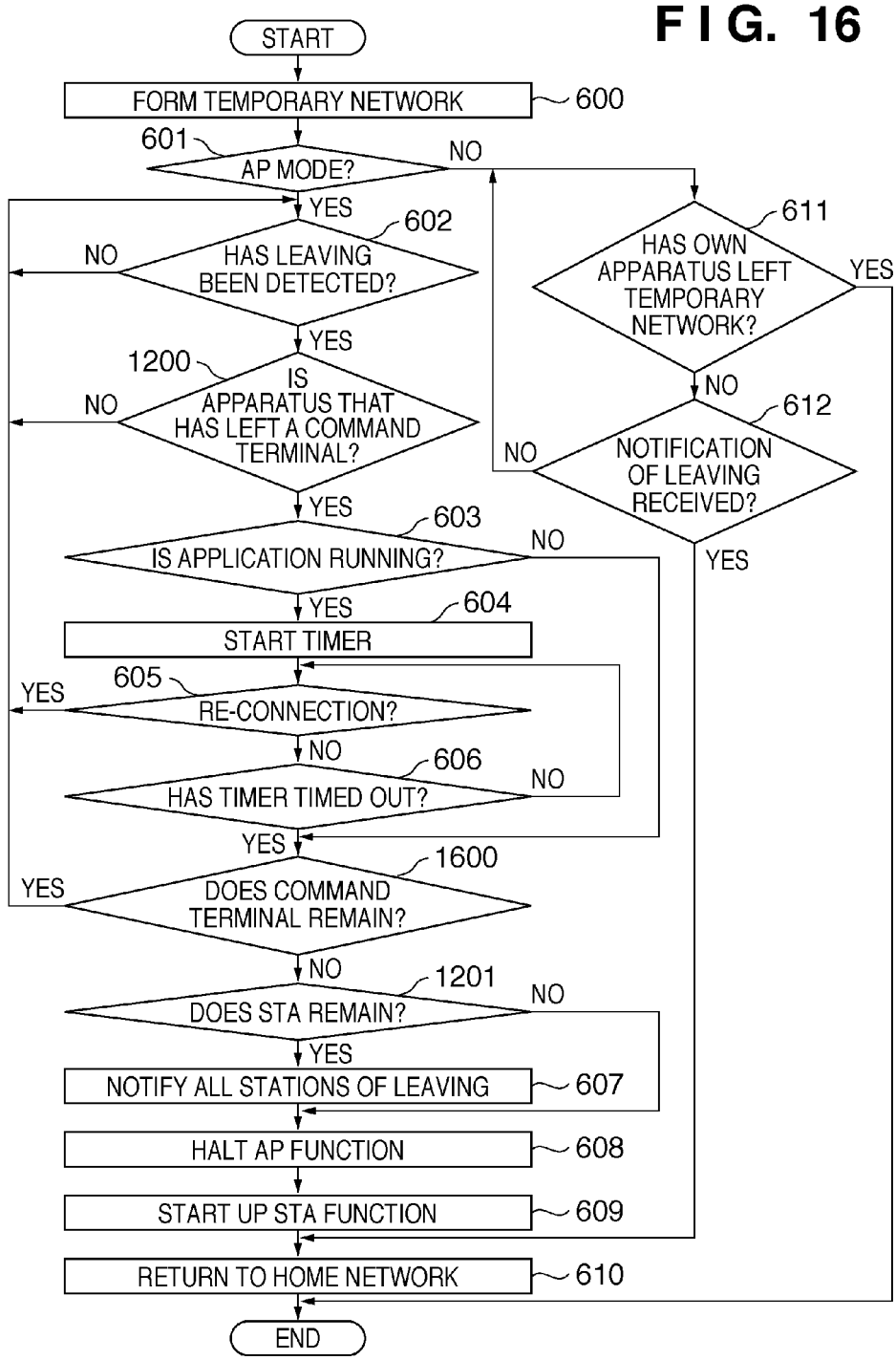
FIG. 16 is a flowchart illustrating communication control of a communication apparatus in the third embodiment.

Reference will now be had to FIGS. 15 and 16 to describe operation in which, after all command terminals have left the temporary network 200, a return to the home network 105 is performed based upon information that has been stored in the STA management register 900 of the display 102. It should be noted that operations similar to those of the first and second embodiments need not be described again; only operations that differ will be described.

FIG. 15 is a sequence diagram illustrating communication control for allowing each communication apparatus to return from the temporary network to the home network in the third embodiment, and FIG. 16 is a flowchart illustrating communication control of a communication apparatus in the third embodiment. It should be noted that this communication control is executed by the communication controllers of the camera 104, display 102, printer 103 and camera 1300.

First, after the temporary network 200 is constructed by the camera 104, display 102 and printer 103, the camera 1300 issues a connection request to the display 102 (S1500). The display 102 then sends the camera 1300 a response to the connection request (S1501). When the camera 1300 joins the temporary network 200, the CPU 400 of the camera 1300 notifies the display 102 of the terminal information (S1502). Upon receiving the terminal information notification, the CPU 400 of the display 102 stores the received information in the STA management register 900 (S1403).

The STA management register 900 of the display 102 at this time stores information in the manner shown in FIG. 14. Specifically, Serial No. 3 is information relating to the camera 1300, for which the MAC address 1001 is "cc:cc:cc:cc:cc:cc", the physical function 1002 is "STA" and the logical function 1003 is "command terminal".

Next, when the camera 104 leaves the temporary network 200 in S500, the CPU 400 of the display 102 determines whether a command terminal exists in the temporary network (1600 in FIG. 16). Since the camera 1300 of Serial No. 3 exists as a command terminal ("YES" at 1600), the CPU 400 of the display 102 returns to the decision step 602. As a result, the camera 1300 is capable of executing an application (e.g., printing) together with the printer 103 (S1504).

Next, the camera 1300 leaves the temporary network 200 (S1505). When this occurs, the CPU 400 of the display 102 determines whether a command terminal exists in the temporary network 200 (1600). As a result, since the camera 1300 that was the sole command terminal existing in the temporary network 200 has left the temporary network 200, the CPU 400 of the display 102 determines that no command terminal exists ("NO" at 1600). From this point onward, the CPU 400 of the display 102 notifies the printer 103 that the temporary network has been left and the display 102 and printer 103 return to the home network in a manner similar to that of the first embodiment.

In accordance with the third embodiment, if a plurality of command terminals exists in the temporary network 200, all communication apparatuses can return from the temporary network to the home network after all of the command terminals have left the temporary network.

[Fourth Embodiment]

Next, a fourth embodiment of the present invention will be described in detail with reference to the drawings. In the first to third embodiments, management of information (FIGS. 10 and 14) relating to communication apparatuses and notification of the communication apparatuses (S1102; 607) that the temporary network has been left are carried out by the display 102, which is the AP of the temporary network 200. However, such management and notification that the temporary network has been left may just as well be performed by a STA within the temporary network. In the fourth embodiment, a case in which the printer 103 performs management and gives notification that the temporary network has been left will be described.

Figure 17:
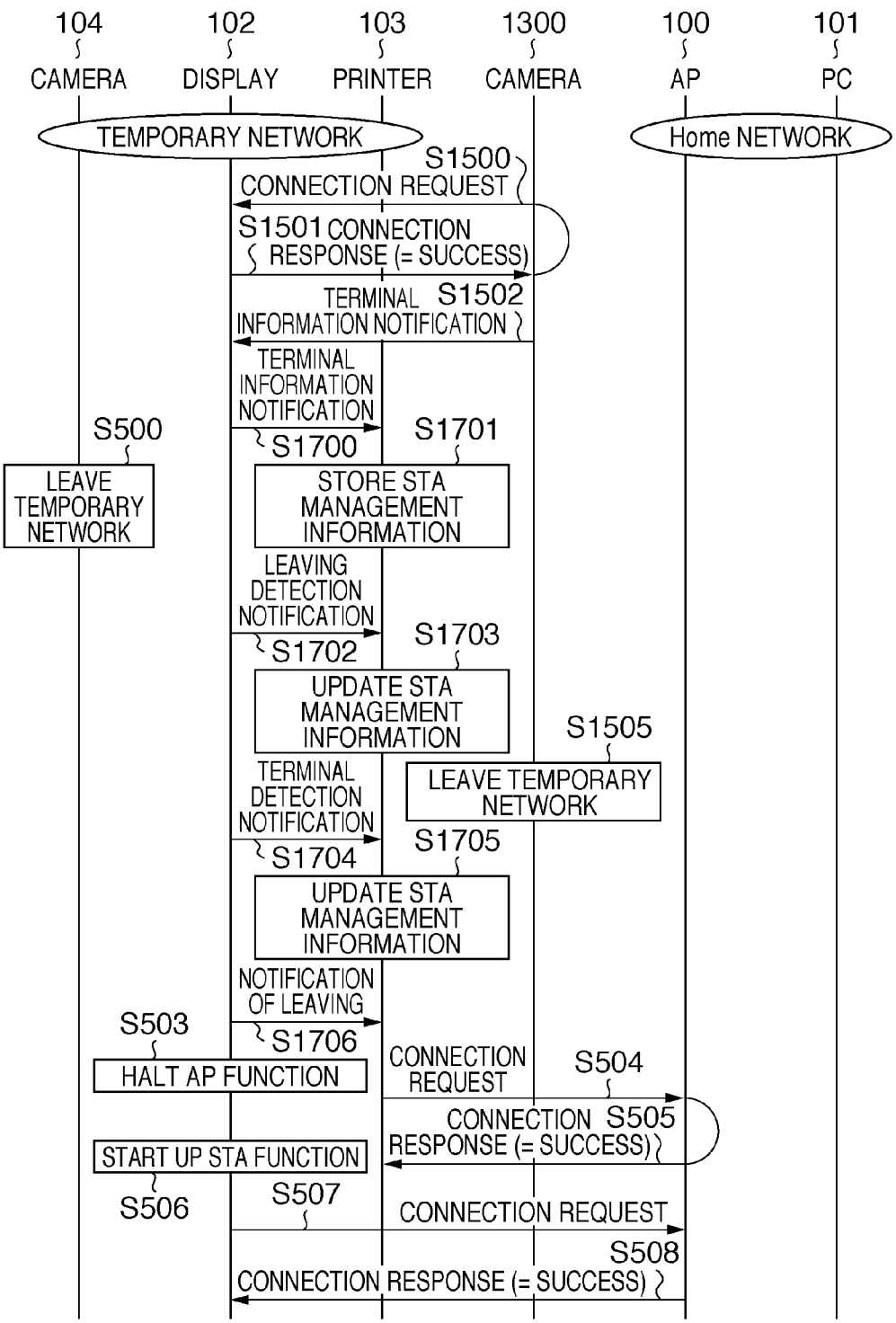
FIG. 17 is a sequence diagram illustrating communication control for allowing each communication apparatus to return from a temporary network to a home network in a fourth embodiment of the present invention.
Figure 22:
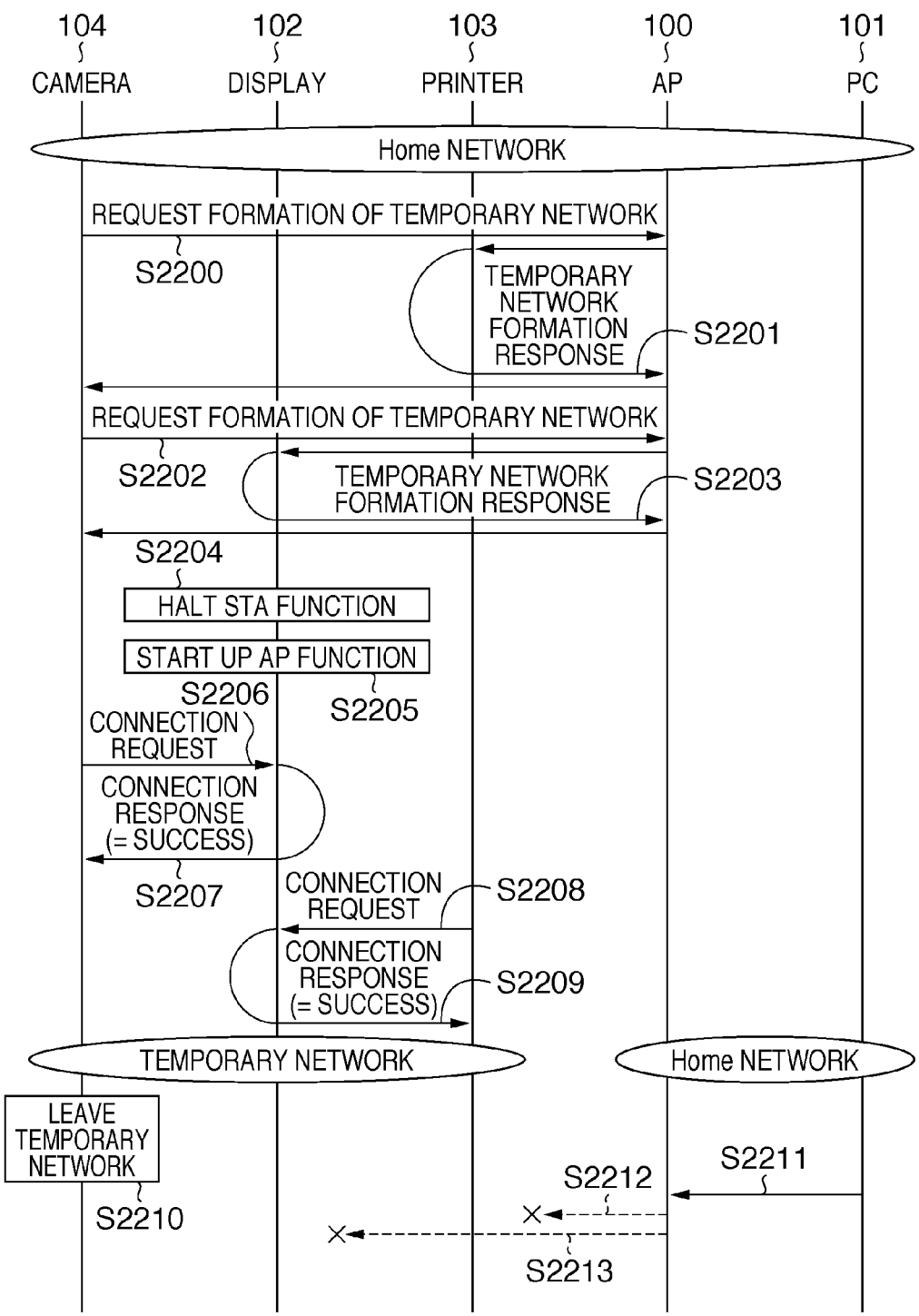
FIG. 22 is a sequence diagram useful in describing a problem that arises with a network communication control method according to the prior art.

FIG. 17 is a sequence diagram illustrating communication control for allowing each communication apparatus to return from the temporary network to the home network in the fourth embodiment, and FIG. 18 is a flowchart illustrating communication control of a printer in the fourth embodiment. FIGS. 19 to 21 are diagrams illustrating the content of the STA management register 900 of printer 103.

After the camera 1300 forms the temporary network as described in the third embodiment, the CPU 400 of a display 102 receives notification of terminal information from the camera 1300 in S1502. Next, the CPU 400 of the display 102 transfers the notification of terminal information to the printer 103 (S1700). As a result, the CPU 400 of the printer 103 stores the received terminal information in its own STA management register 900 (S1701; 1800). FIG. 19 is a diagram illustrating the content of the STA management register 900 of the printer 103. Under these conditions, Serial Nos. 1, 2 and 3 are items of information relating to the camera 104, display 102 and camera 1300, respectively.

When the camera 104 subsequently leaves the temporary network 200 in S500, the display 102 detects that it has left and so notifies the printer 103 (S1702). When the CPU 400 of printer 103 receives this notification from the display 102 and detects that the camera 104 has left the temporary network ("YES" at 602), the CPU 400 of printer 103 determines whether the physical function of the communication apparatus that has left the temporary network is that of an AP.

Here the communication apparatus that has left the temporary network is the camera 104 (Serial No. 1) and the physical function is that of the STA ("NO" at 1802). Accordingly, the CPU 400 of printer 103 updates its own STA management register 900 based upon this notification (S1703; 1800). The content of the STA management register 900 under these conditions is shown in FIG. 20. As illustrated in FIG. 20, the information under Serial No. 1 has been erased because the camera 104 left the temporary network 200 in S500.

Next, when the camera 1300 leaves the temporary network 200 in S1505, the CPU 400 of display 102 detects this and notifies the printer 103 of detection (S1704). Upon receiving this notification and detecting that the camera 1300 has left the temporary network ("YES" at 602), the CPU 400 of the printer 103 determines whether the physical function of the communication apparatus that has left the temporary network is that of an AP.

Here the communication apparatus that has left the temporary network is the camera 1300 (Serial No. 3) and the physical function is that of the STA ("NO" at 1802). Accordingly, the CPU 400 of the printer 103 updates its own STA management register 900 based upon this notification (1800). The content of the STA management register 900 under these conditions is shown in FIG. 21. As illustrated in FIG. 21, the information under Serial No. 3 has been erased because the camera 1300 left the temporary network 200 in S1505.

Next, after it updates the STA management information at 1800, the CPU 400 of the printer 103 determines whether a communication apparatus whose logical function is that of a command terminal exists in the temporary network 200 (1801). As illustrated in FIG. 21, a communication apparatus whose logical function is that of a command terminal no longer exists in the temporary network 200 ("YES" at 1801).

Accordingly, the CPU 400 of the printer 103 notifies the display 102 of the fact that the temporary network has been left (S1706; 1803) and a return to the home network 105 is carried out (610).

It should be noted that in a case where the display 102, which is the AP, has left the temporary network 200 ("YES" at 1802), the printer 103 returns to the home network 105 (610).

Further, the arrangement is such that the camera 1300 notifies the display 102 of terminal information in S1502 and the display 102 transfers this terminal information to the printer 103 in S1700. However, it may be so arranged that the camera 1300 notifies all of the communication apparatuses in the temporary network 200 of terminal information by broadcast in S1502.

Further, in the fourth embodiment, the printer 103 manages information relating to communication apparatuses and notifies of the fact that the temporary network has been left. However, it may be so arranged that each communication apparatus in the temporary network 200 manages this information and returns to the home network 105 autonomously at the moment a command terminal no longer exists ("YES" 1801). In this case, since each communication apparatus manages the information, it is unnecessary to notify the AP (S1706) that the temporary network has been left.

Further, in the first to fourth embodiments, a case where communication between a STA (camera 104, printer 103, camera 1300) and an AP (display 102) is severed has been described. However, similar effects are obtained even if a communication apparatus leaves a logical connection. An example of a logical connection that can be mentioned is UPnP (Universal Plug and Play), The present invention may be applied to a system constituted by a plurality of devices (e.g., host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes per se read from the recording medium implement the novel functions of the embodiments and the recording medium storing the program codes constitutes the invention.

Examples of recording media that can be used for supplying the program code are a flexible disk, hard disk, optical disk, magneto-optical disk, CD-ROM, CD-R, magnetic tape, non-volatile type memory card or ROM, etc.

Further, not only are the functions of the above-described embodiments implemented by executing program code that has been read by a computer; the following case is included as well. Specifically, an operating system or the like running on the computer executes some or all of the actual processing based upon the indications in the program codes, and the functions of the above-described embodiments are implemented by this processing.

Furthermore, it goes without saying that the following case also is included in the present invention. Specifically, program code read from a recording medium is written to a memory provided on a function expansion board inserted into the computer or provided in a function expansion unit connected to the computer. Thereafter, a CPU or the like provided on the function expansion board or function expansion unit performs some or all of actual processing based upon the indication in the program codes, and the functions of the above embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-066735, filed Mar. 14, 2008, which is hereby incorporated by reference herein in its entirety.

The invention claimed is:

1. A communication apparatus comprising:
a processor coupled to a memory, wherein the processor is configured to act as units comprising:
(1) a creating unit which operates as an access point and creates a first wireless network;
(2) a communication unit which communicates with a first terminal apparatus and a second terminal apparatus which participate in the first wireless network, wherein the first terminal apparatus is a specific apparatus and the second terminal apparatus is not a specific apparatus;
(3) a detecting unit which detects that the first terminal apparatus or the second terminal apparatus has left the first wireless network created by the creating unit; and
(4) an ending unit which (a) maintains the operation as the access point of the first wireless network, in a case that the second terminal apparatus left the first wireless network and the first terminal apparatus remains in the first wireless network, and (b) ends the operation as the access point of the first wireless network, in a case that the first terminal apparatus left the first wireless network even if the second terminal apparatus remains in the first wireless network.

2. The communication apparatus according to claim 1, wherein the processor is further configured to act as a transmitting unit which transmits a predetermined signal to another terminal apparatus of the first wireless network, in a case that the detecting unit detects that the first terminal apparatus or the second terminal apparatus has left the first wireless network.

3. The communication apparatus according to claim 1, wherein the processor is further configured to act as a connecting unit which connects to a second wireless network, in a case that the detecting unit detects that the first terminal apparatus has left the first wireless network.

4. The communication apparatus according to claim 3, wherein the connecting unit connects to an access point of the second wireless network.

5. The communication apparatus according to claim 3, wherein the connecting unit connects to the second wireless network as a terminal apparatus of the second network.

6. The communication apparatus according to claim 1, wherein the specific apparatus is an apparatus that performs a specific function.

7. The communication apparatus according to claim 6, wherein the specific function is a function that issues an execution instruction of an application that can be executed by the communication apparatus.

8. The communication apparatus according to claim 7, wherein the application is a print application, and the execution instruction is a print instruction.

9. The communication apparatus according to claim 1, wherein the specific apparatus is an apparatus that requested the communication apparatus to create the first wireless network.

10. The communication apparatus according to claim 1, wherein the first wireless network is compliant with the IEEE 802.11 standard.

11. A communication control method of a first communication apparatus, the communication control method comprising:
 operating as an access point and creating a first wireless network;
 communicating with a first terminal apparatus and a second terminal apparatus which participate in the first wireless network, wherein the first terminal apparatus is a specific apparatus and the second terminal apparatus is not a specific apparatus;
 detecting that the first terminal apparatus or the second terminal apparatus has left the first wireless network;
 maintaining the operation as the access point of the first wireless network, in a case that the second terminal apparatus left the first wireless network and the first terminal apparatus remains in the first wireless network; and
 ending the operation as the access point of the first wireless network, in a case that the first terminal apparatus left the first wireless network even if the second terminal apparatus remains in the first wireless network.

12. A non-transitory computer-readable medium encoded with a computer-readable control program which, when executed by a processor of a first communication apparatus, will cause a computer to execute a communication control method, the communication control method comprising:
 operating as an access point and creating a first wireless network;
 communicating with a first terminal apparatus and a second terminal apparatus which participate in the first wireless network, wherein the first terminal apparatus is a specific apparatus and the second terminal apparatus is not a specific apparatus;
 detecting that the first terminal apparatus or the second terminal apparatus has left the first wireless network;
 maintaining the operation as the access point of the first wireless network, in a case that the second terminal apparatus left the first wireless network and the first terminal apparatus remains in the first wireless network; and
 ending the operation as the access point of the first wireless network, in a case that the first terminal apparatus left the first wireless network even if the second terminal apparatus remains in the first wireless network.

* * * * *